(12) United States Patent
Milroy et al.

(10) Patent No.: US 11,036,725 B2
(45) Date of Patent: Jun. 15, 2021

(54) SYSTEM AND METHOD FOR COMPUTERIZED DATA PROCESSING, ANALYSIS AND DISPLAY

(71) Applicant: Engility Corporation, Chantilly, VA (US)

(72) Inventors: Christopher Milroy, Arlington, VA (US); Paul Vogel, Gainesville, VA (US); John Sahlin, Ashburn, VA (US); Christopher Waychoff, Bethesda, MD (US); James Burke, Arlington, VA (US); Fred Frantz, Marcy, NY (US); Adam Whitlock, Alpine, CA (US)

(73) Assignee: Science Applications International Corporation, Reston, VA (US)

( * ) Notice: Subject to any disclaimer, the term of this patent is extended or adjusted under 35 U.S.C. 154(b) by 717 days.

(21) Appl. No.: 15/676,982

(22) Filed: Aug. 14, 2017

(65) Prior Publication Data

US 2019/0050452 A1   Feb. 14, 2019

(51) Int. Cl.
| | |
|---|---|
| G06F 15/16 | (2006.01) |
| G06F 16/242 | (2019.01) |
| G06F 16/40 | (2019.01) |
| G06F 16/332 | (2019.01) |
| G06F 16/2452 | (2019.01) |
| G06F 16/438 | (2019.01) |
| G06F 16/33 | (2019.01) |
| G06F 16/903 | (2019.01) |

(52) U.S. Cl.
CPC ...... *G06F 16/243* (2019.01); *G06F 16/24522* (2019.01); *G06F 16/3322* (2019.01); *G06F 16/3329* (2019.01); *G06F 16/40* (2019.01); *G06F 16/3338* (2019.01); *G06F 16/438* (2019.01); *G06F 16/90335* (2019.01)

(58) Field of Classification Search
None
See application file for complete search history.

(56) References Cited

U.S. PATENT DOCUMENTS

| | | | |
|---|---|---|---|
| 6,711,563 | B1 | 3/2004 | Koskas |
| 6,789,252 | B1 | 9/2004 | Burke et al. |
| 7,290,048 | B1 | 10/2007 | Barnett et al. |

(Continued)

FOREIGN PATENT DOCUMENTS

| | | |
|---|---|---|
| EP | 1 217 540 A1 | 6/2002 |
| EP | 2 444 906 A1 | 4/2012 |

*Primary Examiner* — Alex Gofman
(74) *Attorney, Agent, or Firm* — Tiajoloff & Kelly LLP (57) ABSTRACT

A computer system receives a query and converts the query into one or more input data types each associated with a respective piece of input constraint data, and one or more output datatypes corresponding to desired data. A data path workflow scheme is created from the datatypes and a catalog of data path modules each of which has defined datatype of its input(s) and output(s) by building candidate data paths forward from the input and rearward from the output of the data path until data paths from all of the outputs connect with at least one of the data path inputs. The data path is then optimized and converted to an executable code data procedure and then run with the constraint data as the input to the procedure. The results can be displayed to a user display device by presentation modules based on the datatype of the output.

21 Claims, 6 Drawing Sheets

(56) References Cited

U.S. PATENT DOCUMENTS

| | | |
|---|---|---|
| 7,631,296 B2 | 12/2009 | Sehadri et al. |
| 8,392,473 B2 | 3/2013 | Thomson et al. |
| 9,117,006 B2 | 8/2015 | Zhu et al. |
| 9,201,923 B2 | 12/2015 | Weng et al. |
| 2002/0174000 A1 | 11/2002 | Katz et al. |
| 2004/0153350 A1 | 8/2004 | Kim et al. |
| 2006/0167835 A1 | 7/2006 | Aggarwal et al. |
| 2008/0250045 A1* | 10/2008 | Balassanian .......... G06F 16/258 |
| 2009/0327255 A1 | 12/2009 | Larson et al. |
| 2012/0059863 A1 | 3/2012 | Thomson et al. |
| 2013/0246392 A1 | 9/2013 | Farmaner et al. |
| 2014/0280292 A1 | 9/2014 | Skinder |
| 2015/0058339 A1 | 2/2015 | Nijjer et al. |
| 2015/0058712 A1 | 2/2015 | Berk et al. |
| 2015/0127258 A1 | 5/2015 | Mont-Reynaud et al. |
| 2016/0132567 A1 | 5/2016 | Dole et al. |
| 2016/0321277 A1 | 11/2016 | Costabello et al. |
| 2017/0046432 A1 | 2/2017 | Desineni et al. |
| 2017/0046437 A1 | 2/2017 | Desineni et al. |
| 2017/0046438 A1 | 2/2017 | Desineni et al. |
| 2017/0060994 A1 | 3/2017 | Byron et al. |
| 2017/0160813 A1 | 6/2017 | Divakaran et al. |

\* cited by examiner

SYSTEM AND METHOD FOR COMPUTERIZED DATA PROCESSING, ANALYSIS AND DISPLAY

FIELD OF THE INVENTION

This invention relates to the field of computerized data searching, and more particularly to systems and methods for receiving queries and generating from the queries computerized procedures for determining answers to the queries, as well as systems and methods for interfacing with various databases.

BACKGROUND OF THE INVENTION

A variety of systems exist for searching databases and analyzing data based on queries. Most commonly, databases are searched using systems with fixed workflows, in which a specific query is entered using a fixed query language and the system interprets that query language, searches a database, and returns a result. For example, in a company database, a user might be able to enter an employee's identification number and obtain the employee's work file data.

In these fixed systems, only limited, pre-defined variations in the query are possible. Essentially, they are configured to answer one question or one of a set of predefined questions. If a user tries to submit an unsupported query, the system is unable to provide results.

A number of artificial intelligence (AI) systems have been developed for addressing user data requests. Some AI engines focus on implementing methods to generally solve a broad class of problems. In those systems, the algorithms behind the core AI engine usually attempt to interpret and answer a question posed in natural language, but rely upon a single inflexible general method to do so. As a consequence, the quality of the query results can vary widely because the method is suited in different degrees to different types of queries.

Other AI systems are designed to precisely solve a specific problem (e.g., autonomous piloting of a drone). In those systems, however, the data processing and calculations are so specific that they are not extensible to other mission requirements, preventing the system from integrating or being integrated with other systems.

Generally, existing AI systems rely on a single method, whether general or specific, that is so cumbersome or inflexible that cannot be readily be used with other systems or adapted to new types of data query.

SUMMARY OF THE INVENTION

It is therefore an object of the invention to provide a system and method of operation that overcomes the drawbacks of prior art.

According to an aspect of the invention, a computer-executed method for obtaining information for a user is provided. In the method, a query input is received from the user and converted into data defining a set of one or more query input datatypes selected from a stored set of datatypes,
a set of one or more query output datatypes selected from the stored set of datatypes, and
a constraint data field for each of the query input datatypes;

Data path scheme data is then determined that defines a data path scheme based on the data defining said one or more query input datatypes,
the data defining said one or more query output datatypes, and
stored data identifying a set of data path modules.

Each data path module has one or more module inputs and one or more module outputs, and each of the module inputs and module outputs is associated with one of the datatypes in the stored set of datatypes.

The data path scheme has one or more data path inputs and one or more data path outputs each associated with one of the datatypes. The data path scheme data defines linkages of data path modules selected from the set of data path modules so that the data path scheme data defines, for each of the data path outputs, a respective data path that extends through the data path modules between said data path output and one or more of the data path inputs. The data path scheme data defines the linkages between the data modules so that the linkages to each of the data module inputs are from a respective one of data path inputs or a respective one of the data module outputs, and linkages from the data module outputs are to a respective one of the data module inputs or to a respective one of the data path outputs. The linkages are only between inputs or outputs that are associated with the same datatype.

According to another aspect of the invention, a system provides access to data to a user. The system comprises a computer having computer accessible data storage associated with it, and an input device associated with the computer providing one or more queries from a user to it. The computer has stored on it stored data-type data that constitutes a collection of datatypes of data, and stored data-module data that constitutes a catalog of data modules each having a field identifying the data module, and fields identifying datatypes of one or more module inputs and one or more module outputs. The computer also has stored on it an interactive program that causes the computer to receive the query and convert the query into data that defines a. a set of one or more query input datatypes selected from a stored set of datatypes,
b. a set of one or more query output datatypes selected from the stored set of datatypes, and
c. a constraint data field for each of the query input datatypes.

The computer further has a data-path generating program that generates data path scheme data that defines a data path scheme formed of linked data modules selected from the catalog of data modules. The data path scheme has one or more data path inputs each corresponding to a respective one of the query input datatypes and one or more output data paths each corresponding to a respective one of the query output datatypes.

Each module input of each data module of the data path scheme is connected with and receives data from either one of the data path inputs or one of the module outputs of one of the other data modules of the data path. The data path outputs are each connected with and receive data from the module output of one of the data modules or one of the data path inputs.

The computer also has data path execution module software that performs a series of data operations defined by the data modules of the data path scheme, wherein the constraint data is supplied to the data path inputs so that a workflow based on it proceeds according to the data path scheme and yields output result data at the data path output or outputs. Presentation software receives the output result data and transmits or displays the output result data to the user.

According to another aspect of the invention, a software system or system of computer programs and a method, collectively defined as an artificial intelligence engine, is provided that chains together other software modules automatically to accomplish substantially more complex tasks than any of the modules could accomplish alone.

The system is organized into three components: the central engine itself; a list of modules and associated metadata (the "module catalog"); the modules themselves, including data retrieval, data transformation, input, and output modules, each type of which interacts differently with the engine; and a software program that optimizes the central engine over time (the "learning layer").

In response to an input from a user via an input module, the system accesses the module catalog and develops a data path scheme that chains together data retrieval and transformation modules by calculating a path across the graph implied by the module catalog to accomplish the task requested by the user. The actual processing can take place inside the computer system on which the central engine resides or remotely (such as in a cloud processing network). The results of the process are then displayed to the user or otherwise utilized via the output modules.

In another aspect of the invention, throughout the process, the module catalog records which modules are used and forms composite modules from the individual underlying modules. For instance, if module A takes datatype X and transforms it into datatype Y, and module B takes datatype Y and transforms it into datatype Z, composite module C can be formed in the module catalog which takes datatype X and transforms it into datatype Z by the composition of modules A and B.

According to another aspect of the invention, at the end of each use of the system, feedback is collected from the user by methods specific to the implementation for a given user, and the feedback informs the learning layer of the relative success or failure of an output to meet the user's needs. The feedback also is used by the system to update an anticipated value of use of each module in the data path scheme, and the assessed values of the modules are used by the engine when calculating paths across the implicit graph.

The system of the invention can be employed across an array of pursuits. Due to its flexibility, the system can work equally well with modules implementing military doctrine, assisting intelligence analysis, analyzing space missions, or supporting high-performance computing. The system and methods of the invention reduce the time and personnel required to perform complex data analysis, synthesis, and presentation and allow analysts to focus on high-value cognitive tasks.

The system furthermore eliminates the marginal training time otherwise entailed in introducing a new tool, dataset, or capability to users, and it also allows new tools, datasets, and capabilities to be integrated into automated workflows much more quickly than traditional development efforts.

The system also builds trust with users by enabling them to access the data path scheme and see exactly what information was being processed had at each step of the process. The lightweight engine and flexible implementation options allow it to be integrated into a wider array of systems than AIs that need large databases to preprocess data searches. The decentralized system model also improves security and can build upon existing security features in host datasets and network architectures.

Additionally, the system of the invention may be used to enable faster, more comprehensive, and more sophisticated analysis of business data of an enterprise. Businesses may use the system of the invention to develop marketing strategies, manage HR systems, assist with logistics optimization, and other operations for which typical software development requires an extensive, monolithic development effort rather than the contained, flexible approach of the system of the invention.

Other objects and advantages of the invention will become apparent from this specification.

DETAILED DESCRIPTION

The system and method of the invention are typically implemented in a computer system having a central processor or processors, memory and data storage, as well as well-known peripheral devices such as a monitor, a keyboard and a mouse, as well as data storage that is accessible by the computer processor and that stores software that is accessed and executed so as to cause the computer to function to perform the novel methods described herein. A connection to a local area network (LAN) or the Internet is typically also provided to access remote data needed for the data analysis or searching. The host computer system may also be itself distributed over separate computers linked by a network so as to allow performance of separated parts of the method in discrete modules operating on separate computer systems potentially simultaneously, with either distributed or shared data storage, as is well known in the art.

System Overview

Figure 1:
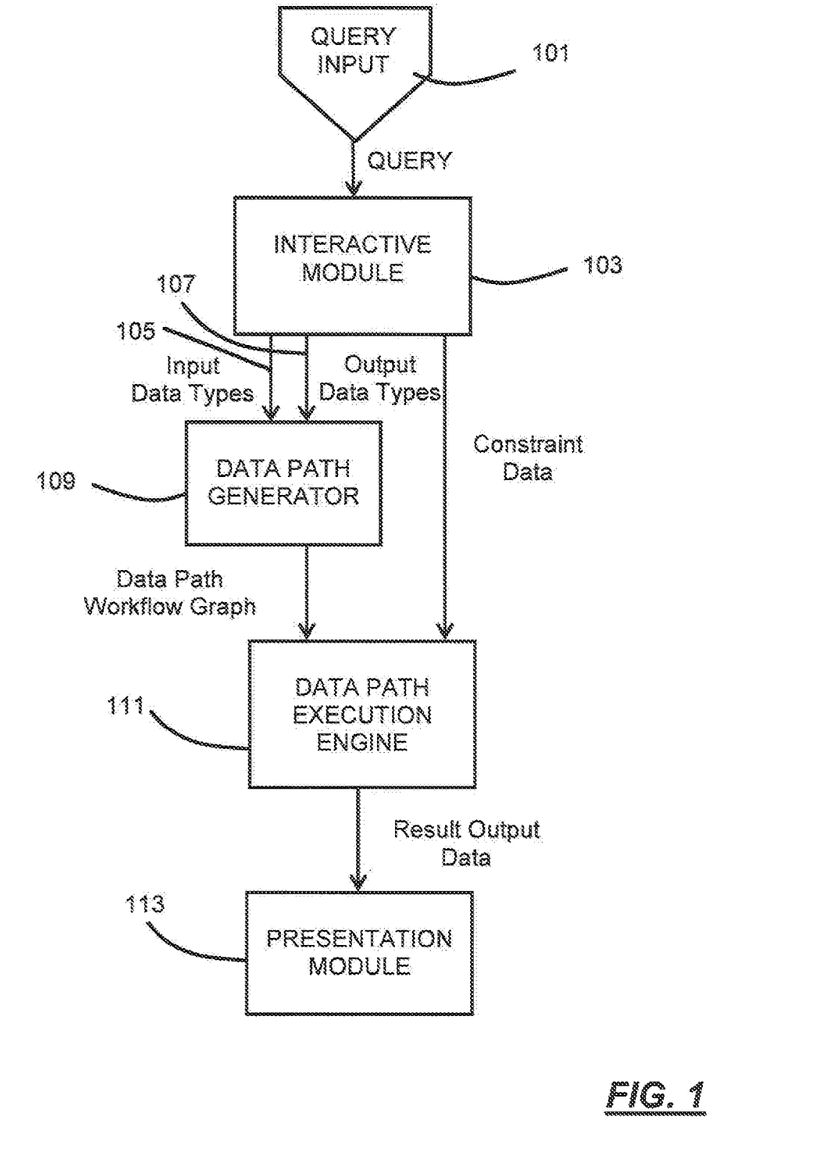
FIG. 1 is a schematic of the system of the invention.

Referring to FIG. 1, a computerized system of the invention is provided with a data entry and display device as is well known in the art, such as a computer with a keyboard, mouse and monitor, and a user may input a query 101 through the data input device.

The query is processed in the computer system by an interaction module 103 which is the computer executing software in order to process the query. From the query, the interactive module 103 produces three sets of interactive module output data that constitute a functional translation of the query into a format of data that the system can use to secure a response to the query.

These three sets of data are a. data defining one or more output datatypes or classifications 105, b. data defining one or more input datatypes or classifications 107, and c. data defining one or more elements of constraint data values for the input classifications.

The query is preferably in English or another natural human language, and the interactive module parses the interrogatory or imperative sentence according to syntax rules defined in the software which mirror specific natural language constructions to yield the three sets of data. As appropriate to a specific embodiment, however, a wide array of input devices can be incorporated via interactive modules, with specific inputs parsed into queries according to analogous syntax rules. For instance, a microphone and speech recognition software, combined with a touch interface, could accept the verbal query "What is that?" and replace "that" during parsing with the object currently being indicated via the touch interface.

As a very simple example of these sets of data, a query could be "What is the name of the person residing at 123 Main Street, Springfield, Va.?" In such a query, the output datatype is a generic descriptor of the data that is sought in the query, which in the exemplary query would be the name of a person, and the datatype would correspond to that, e.g., the character string "name of person". Similarly the input datatype is the descriptor of the data submitted with the query, which in the query of the example would be an address or residence, here specified as 123 Main Street, Springfield, Va.; this datatype would be a character string such as "address" or "resident's address". The constraining data would be value or information provided in the query that is of the input datatype, which is in the query example the character string "123 Main Street, Springfield, Va.".

According to the invention, much more complex queries can be submitted, and a given query may have many datatypes involved. The output data may comprise a large number of discrete values, each with its own datatype. Similarly, there may be a large number of input datatypes and corresponding constraint data values.

Input datatypes and the data output types are selected from a database of possible datatypes that the system can understand or process. This set of datatypes is preferably stored in computer-accessible memory as a data list of all the possible datatypes defined field values. The fields of data may be character strings that are descriptive of the data, e.g., "name" or "residence_address", or they may be simply unique data values for each identified datatype on the list.

After conversion to the three sets of data, the data defining the query data input types and the data defining the query data output datatypes, i.e., the datatypes of the answers sought by the query, is then transferred to a data path generator 109. The data path generator 109 has access to a database storing a set or a catalog of data path modules, and data path generator 109 organizes and links selected data path modules so as to connect the data input types with the data output types, as will be described herein.

The data path generator 109 generates data defining a data path workflow or scheme in the form of a graph database. The data path scheme is a workflow of how the query data acquisition and analysis proceeds from the input datatypes of the specific query to the output datatypes of the query according to the modules of the system. As will be further described below, the data path scheme is determined or formulated in a method similar to that of a Global Positioning System (GPS) system assembling a route between two points on a map by linking a series of map road elements together so as to produce a map route that connects the two points on the map, preferably in the most efficient route possible. The data path scheme or workflow graph derived by the data path generator 109 is transmitted to the execution engine 111, which is also software operating on the same computer system or another system.

Execution engine 111 receives the data path graph received and from it creates data for an executable workflow instruction package that can be executed on the hosting computer system, or possibly another system performing the data processing for the query. In addition, execution engine 111 receives the constraint data from the interactive module 103, and links each piece of the constraint data to a respective data path input that has associated with it the same datatype. The execution engine then executes the data path workflow using the package, applying input data to the data path scheme workflow in the form of the constraint data received in the module 103.

The constraint data when applied to this series of modules or function calls passes through the data path workflow with the result that execution engine 111 produces results in the form of output result data, each piece of which is associated with a respective one of the query output datatypes or classifications from the query. This result output is then transmitted to a presentation module 113, which either displays the data to the user that input the query 101 or, if the query was received from an automated system that automatically presented the query to the system 100 of the invention, then the output result data is then transferred or otherwise sent to that requesting computer system for display or use by it.

Interactive Module or Modules

Figure 2:
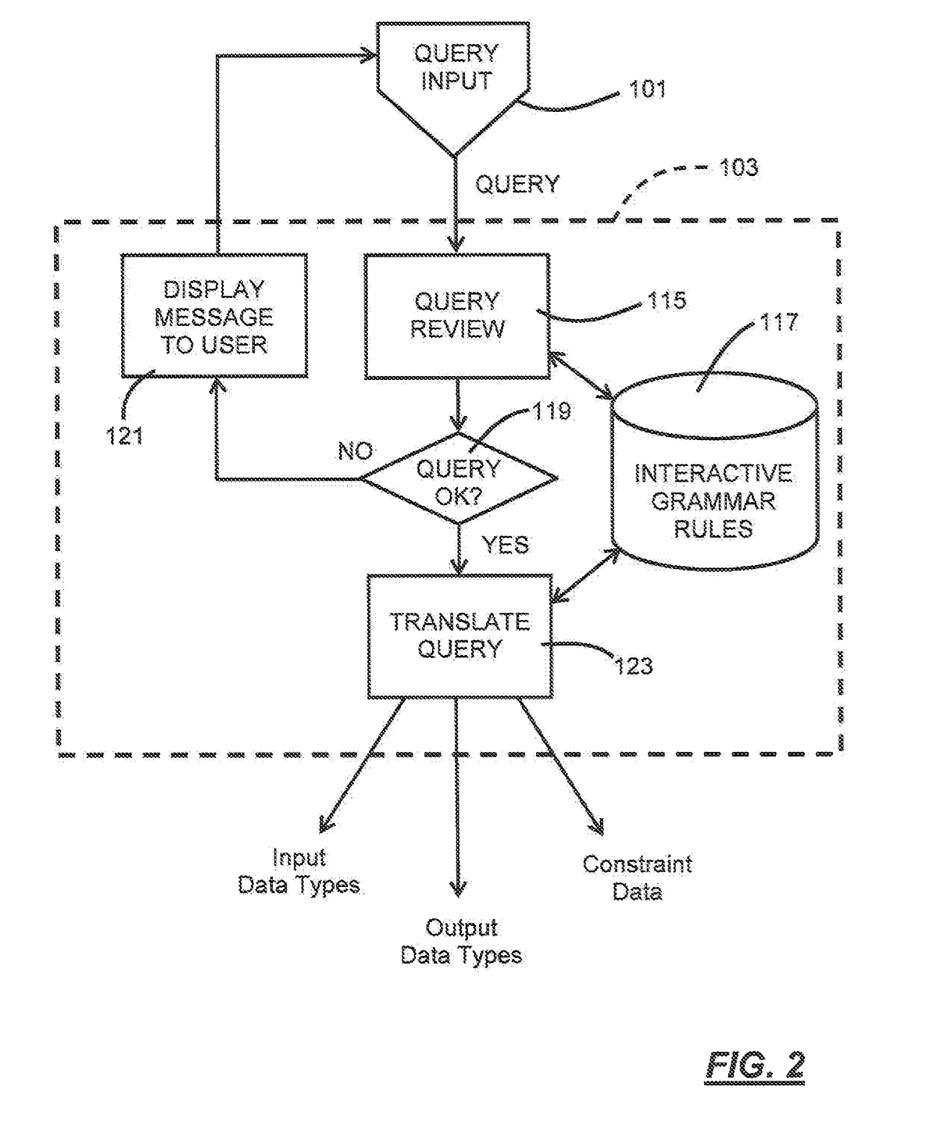
FIG. 2 is a diagram of the interactive module for processing of queries.

Referring to FIG. 2, a query is introduced to the interactive module via any input method, e.g., a user entering data on a keyboard, or potentially a query received from a separate computer system submitting the query automatically over a network or received by any of a variety of methods by which queries are commonly submitted to a data-searching or analysis computer.

The query is in the form of a human-language question or a formatted inquiry analogous to a question, including a command in imperative form. On receiving the query 101, the interactive module initially performs a query review 115 based on a set of interactive grammar rules 117 that are stored so as to be accessible to the computer performing the query review. If the query conforms to the syntax rules of the interactive grammar so as to be comprehensible to the system, the query is translated (step 123) to determine its specific meaning by applying the rules 117, i.e., the translation segment 123 using the interaction grammar rules then converts the query into constituent data, which is specifically a. one or more input data classifications,
b. one or more data output classifications, and
c. constraint data that is provided for the input datatypes or classifications.

On the other hand, if, when the query is reviewed, a determination is made that the query does not comply with the rules of syntax or grammar, the system then responds to the user or to the querying system with an error message to display or otherwise process in step 121. The error message may include an invitation to correct the query format or wording based on the interactive grammar rules 117, or a question with a dropdown list of possible query forms may be displayed to the user. A new query may then be input by the user and a new query 101 presented to the interactive module.

The production rules specify how queries can be formulated to be translated accurately by the interactive query input module into an appropriate query that can be converted into a workflow graph. The exact form and the complexity of the production rules depend the specific type of queries that may be expected or based on the specific user, but they all follow the requirements of a context-free grammar in order to be efficiently analyzed by a computer.

The rules 117 are an interaction grammar, which comprises a list of text strings in the form of production rules that define part of a context-free grammar. Rules and grammar of this type are well-established in the art of linguistics and the art of computer processing of human language inputs.

Generally, each of the interactive grammar rules has a left-side expression and a right-side expression. The left side contains a non-terminal symbol and the right side contains a combination of one or more terminal or non-terminal symbols. An example of a very simple use case dealing with people could employ the following production rules:

$empty_string$->$question_word$
$question_word$->Who $verb$
$verb$->is $property$
$verb$->was $property$
$verb$->has $possession$
$property$->tall
$property$->short
$possession$->a house
$possession$->a dog Applying these rules, an Interaction Module can determine efficiently that "Who is tall?" is a query that is consistent with the Interaction Grammar, while "Who is a house" is not, because the verb "is" requires a property, which can be "tall" or "short", but is not satisfied by house, which is in the rules but identified as a possession, not a property.

Applying the interaction grammar, interaction module can be implemented to both translate user inputs into grammar consistent queries and to assist users in formatting those queries appropriately. In a preferred implementation, the interaction module displays to the user what might make a query consistent with the interaction grammar. In the simple rules example above, if a user had said or produced a query of "who" for instance, the interactive module would propose a dropdown list in a display shown to the user in which the possible next word that could be entered in the query according to the rules, i.e., the word "is", the word "was", or the word "has".

Input datatypes are typically associated with each word or information selected from stored data of all possible datatypes stored on the system so as to be accessible to the computer system performing the translation function. The datatypes are typically stored as data organized in a list or tree data structure. Where stored as a tree, the tree data structure may be organized as an Extensible Markup Language (XML) tree arrangement in which a first level of nodes is linked with specific lower level nodes for datatypes that can only be associated with that node.

For example, the initial nodes of the datatypes can be person, residence and business, each of which may have a number of its own sub nodes, such as, e.g., person.first_name, person.family_name, person.telephone_number, person.date_of_birth, residence.address, residence.mortgage_status, residence.phone_number, and business.company_name, business.address, and business.tax_id_number. Those lower nodes may have in turn further lower levels of branches of the tree defined in XML. Also, the higher level nodes may be provided with a default subnode that is used when only the higher-level node is identified, such as where residence might be construed automatically to reference residence.address.

The specific datatypes may vary depending on the expected subject matter of the queries, but preferably include definitional terms that can be recognized by the query review module and the interactive grammar rules 117. The label of the input datatype may be anything, e.g., a descriptive character string such as "name_of_person" or "social_security_number", but may also be any string of characters or numbers that could be used to identify a specific type of data that is provided with a query to initiate the database search workflow.

Output datatypes similarly are selected from sets of possible datatypes that can be produced by the workflow data paths of the system.

Constraint data is a set of character strings, arrays, lists, matrices, or other data structures that are each tagged with the associated type of input datatype to which it corresponds.

Once the data defining the input datatypes, the output datatypes and the constraint data is analyzed so as to yield translated query data, that translated query data is transferred to the data path generator 109.

Data Path Generator

The data path generator 109 is a software engine executed on a hosting system, preferably the same computer as the one that hosts the interactive module or modules. The data path generator 109 is configured to organize a set of data path modules, each of which performs one or more of several functions, which may include a data processing extraction or modification or acquisition operation.

Generally, the data path modules are software modules, subroutines or function calls that either perform data retrieval or data transformation. Data retrieval modules go to databases and return with data stored in those databases accessed based on any arguments provided to the data retrieval module. Data transformation modules may perform simple or complex operations on the data sent to them as arguments. For example, a simple data transformation module might receive as an argument an array of phone numbers and de-duplicate them, returning an array containing a single copy of each of them. A more complex data transformation module might receive as an argument a matrix or table composed of records containing multiple fields of data and use machine-learning procedures to perform anomaly detection on the records, returning those records that are identified as anomalous by the procedures.

The resulting workflow data path or graph has inputs that are configured to receive data according to the input datatypes of the query, and one or more outputs each corresponding to a respective one of the output datatypes of the query that produce the response to the query when the constraint data is loaded into the inputs and the data path executed by the host computer.

Data Path Scheme

Figure 4:
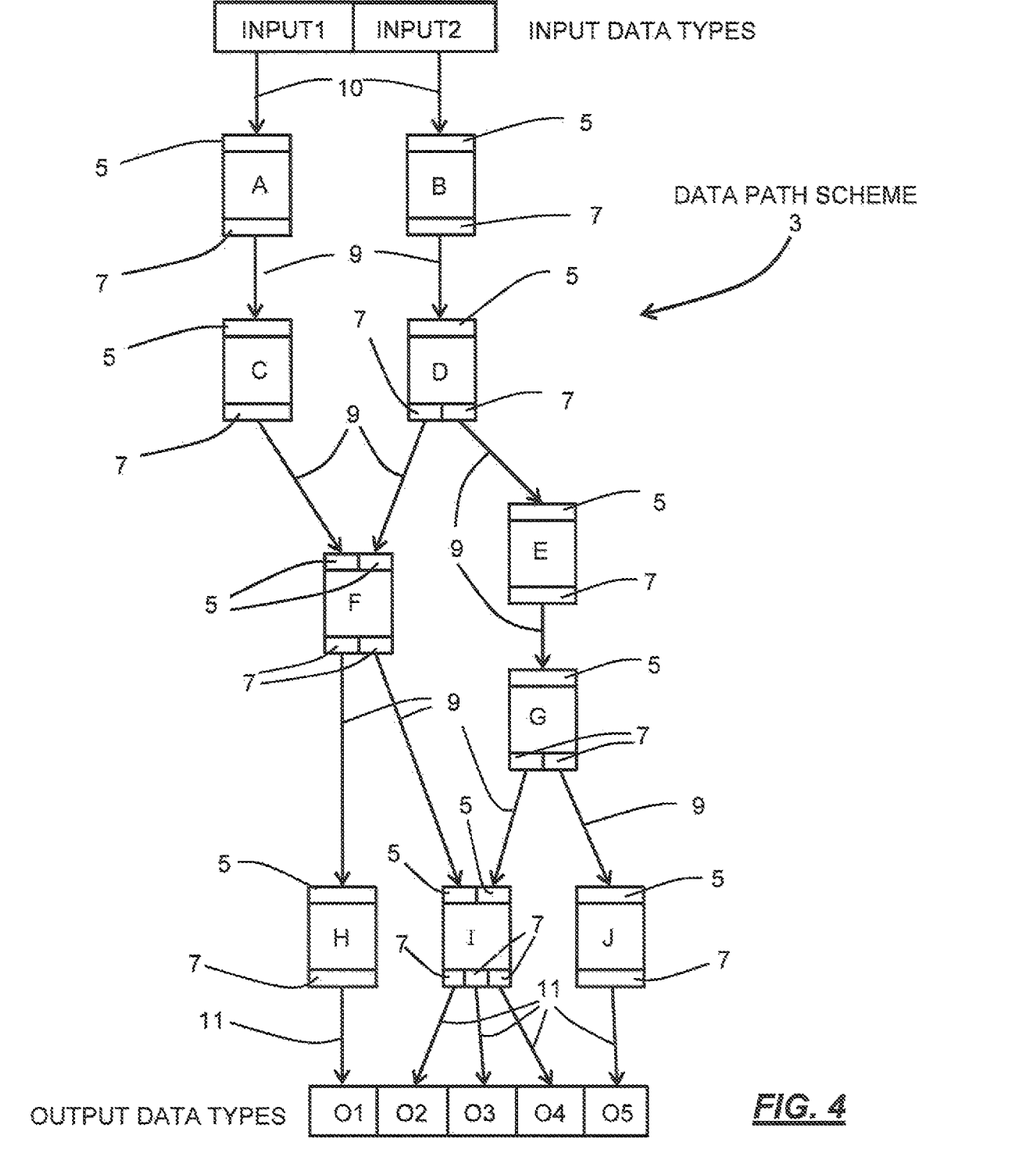
FIG. 4 is an example of a simple data path scheme according to the invention.

FIG. 4 shows an example of a fairly simple data path scheme according to the invention generally indicated at 3. The data path scheme 3 is formed by linking a number of data path modules A to J, which are assembled in response to a query that was translated into two input datatypes, INPUT1 and INPUT2, and five output datatypes O1, O2, O3, O4, and O5.

Each data path module is configured to receive one or more module inputs 5. Each of the module inputs 5 is associated with a datatype in the data-type list or tree described above that identifies the type of data that it is configured to receive and act upon or with. Each data path module also has one or more module outputs 7 that output data values responsive to the data path module receiving data at its module inputs 5. Each of the module outputs 7 similarly has a respective datatype selected from the list or tree of datatypes that identifies the type of data that the data module supplies to that module output as a result. Each data path module may have as many module inputs and module outputs as desired for its function. For instance, in FIG. 4, data modules A, B and C each have only one module input 5 and only one module output 7. On the other hand, data path module I has two module inputs 5 and three module outputs 7.

Linkages 9, 10 and 11 connect or link the data-path modules so as to define the data-path scheme 3 between the data path inputs and data path outputs O1 to O5. Linkages 9 connect the module outputs 7 of all the data path modules to the module inputs 5 of other modules. Linkages 10 connect the data path inputs, which correspond to the query input datatypes, to the module inputs of the first modules of the data path scheme, which in the example of FIG. 4 are data path modules A and B. At the other end of the data path scheme, each of five linkages 11 connect respective module outputs 7 of the last modules, i.e., data path modules H, I and J, to the data path outputs O1 to O5, which correspond to the respective five datatypes derived from the query.

The data path generator 109 generates the data defining the data path scheme 3, and this data is preferably formulated as a graph database stored in the computer memory. In that graph database, the stored data defines the data modules as edges in the graph, and the linkages between the modules are defined as nodes.

One general principle of the data path schemes or graphs of the invention is that each of the linkages in the data path scheme that connect module outputs to module inputs, data path inputs to module inputs, or module outputs to the data path outputs, must connect inputs or outputs that are both associated with the same datatype from the datatype database.

Another requirement of the data path schemes of the invention is that there must be a data path that tracks back from each output datatype/data path output through the data modules to one of the data path inputs. The data path may share modules with the data path from another data-path output back to another data-path input.

Also in the data path schemes of the invention, all of the data module inputs 5 are connected by a data path to one of the data-path inputs. That means that each data module in the data path graph is linked to receive data at all of its required inputs.

In the preferred embodiment, the data path scheme data is determined so as to define the data path to be executed. The graph of this data path scheme is then automatically converted to an executable software procedure, and that procedure is then executed by the host computer using the constraint data of the query as input values at the data path inputs of the procedure. The data modules of the data path are usually function calls or other subroutine calls or commands to access databases, either local or remote to the hosting computer system performing the procedure, and the module inputs are usually expressed as arguments for the function calls or other data values transmitted to the routine or database access commands. The outputs of the module are the data returned by the subroutine or function call, or the data derived from the data acquisition.

Generation of the Data Path

The data path scheme graph is created by the data path generator module 109, which organizes or maps the data modules with linkages between them so as to connect the data-path inputs to the data-path outputs.

Figure 3:
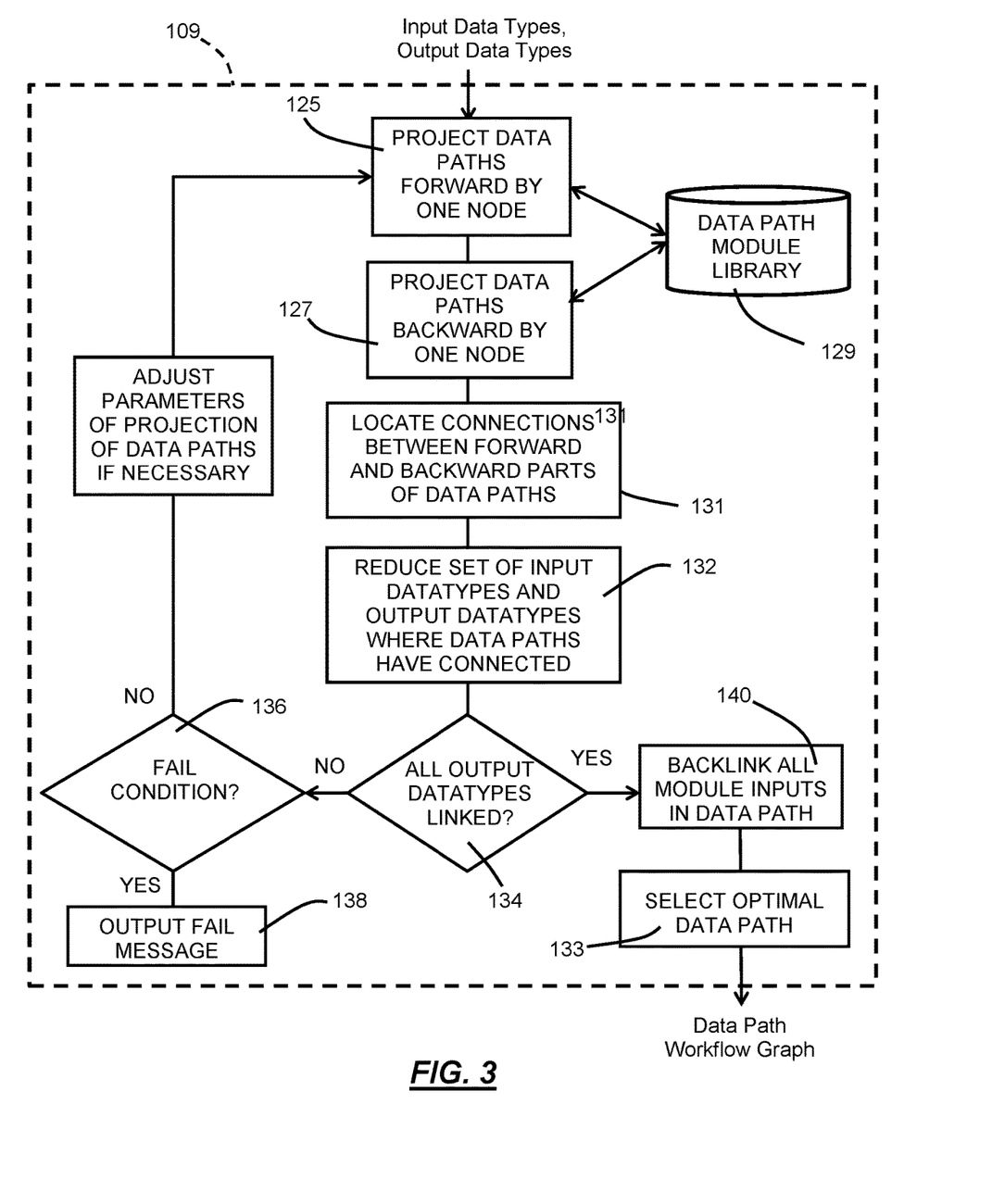
FIG. 3 is a diagram of the data path generation module operation and components.

Referring to FIG. 3, the data path generator 109 organizes the data modules for the data path scheme similarly to the organization of route segments for a GPS system calculating a route between two points on a map, with the additional proviso that the calculated data path in the present invention must go to all of the query output datatypes.

The data path scheme is generated by working forward from the input datatypes of the query and backwards from the output datatypes. The projecting forward of the data path, step 125, accesses a catalog of stored data path modules 127. The projecting backward step 129 relies on the same catalog of data path modules.

The data path module catalog 127 is a structured database typically stored in computer-accessible memory in relational format, and it contains a record for each of all available data path modules. At a minimum, the record includes a display name for the module; a function location; a function-call template or format, the input datatype or datatypes, and the output datatype or datatypes. Other fields can be included in the data path module catalog, including, in particular, a Module Time Estimate, a Module Utility Rating, and Module Display Options, i.e., a field containing a list of displays on which information from a given data path module can be shown if the embodiment has multiple such displays available to it.

The Display Name is a text string title for the module that may be used with the data path modules to help the user understand the workflow, for instance by displaying the Workflow Graph. The Display Name is also important for logging and debugging purposes so the developer/implementer can understand which workflows are being generated.

The Function Location is a file path, URL/URI, or other text string or expression translatable by the host computer engine into a text string, identifying the location—whether local to the computer system running the data path generator or elsewhere, such as in a cloud storage system—of the file that contains the actual algorithm to be run when the module is called. The typical implementation contains a code library at the specified location, containing the relevant function software that can be accessed by the executing engine.

The Function Call is a text string containing an expression translatable into the code required to call the function found at the Function Location. The text string is configured so as to be parsed by the translation software into literal components, e.g., the name of the function as contained in the library at the Function Location, and any formatting required by the language in which the function is written, such as punctuation, and interpreted components, as well as datatypes and data structures used internally by system. For example, the string "array::person.social_security_number" could be used to indicate that the function takes as an argument in that position an array of social security numbers, where the datatype "social_security_number" for the object type "person" could be outputs of another module in the catalog.

The interpreted components for the function call may include Boolean OR operators to enable alternative datatypes for a single positional argument, for instance if a given function can accept an array of IPv4 or IPv6 addresses, then the interpreted component could be listed as "array::web.ipv4|array::web.ipv6", indicating that an array of either type can be used as that argument to the Function Call.

The exact formulation of the definition of the function arguments and their formats may vary, so long as the translation program can generate a syntactically correct function call.

The Input Datatype or Datatypes is a list of sets of datatypes, such as person.social_security_number or web.ipv4 from the description in Function Call, that can serve as the arguments to the function at the Function Location that is called by the Function Call. The datatypes must correspond to datatypes in the interpreted components of Function Call.

The purpose of Input Datatypes is to capture the potentially high (combinatoric) number of combinations of inputs and outputs that a given function might accept, and in the preferred implementation, this takes the form of a regular expression. For instance, where the data path module is a database search function, the function call for the module may be able to accept dozens of required and/or optional filters as arguments. In that case, the Input Datatypes for the data path module can contain a list with alternative datatypes in addition to the required datatypes, possibly expressed as $$\{Req1 \ \& \ Req2 \ldots \& \ Reqn\} \ \& \ \{Op1|Op2|\ldots|OpN|none\}$$

in which Req1 to Reqn are some number n of required datatypes for the arguments of the function call, and Op1 to OpN are some number N of additional optional arguments for the function call.

The Output Datatype or Datatypes is a list of sets of datatypes that can be returned from the function at Function Location that is called by Function Call. If there is more than one set of returned datatypes, then the function call will typically have an optional argument that specifies which set of Output Datatypes to return.

The Module Time Estimate is data defining a numerical estimate of the time needed for the module to run. Its value may range from microseconds to days depending on the module's action, i.e., a quick computation may be almost instantaneous, while a data acquisition module that involves, for example, a special satellite operation may take a day or more. The Module Time Estimate may be updated over time by the data path generation engine as actual user data regarding execution time of the module is obtained in the system.

The Module Utility Rating is a value developed over time by input of users that indicates their satisfaction with or preference for the particular data module, or with data paths that employed that module. It may be a data field defining a number from 1 to 10 or 100 based on the user reactions to data paths with the module, or any sort of preferential grading system.

Figure 5:
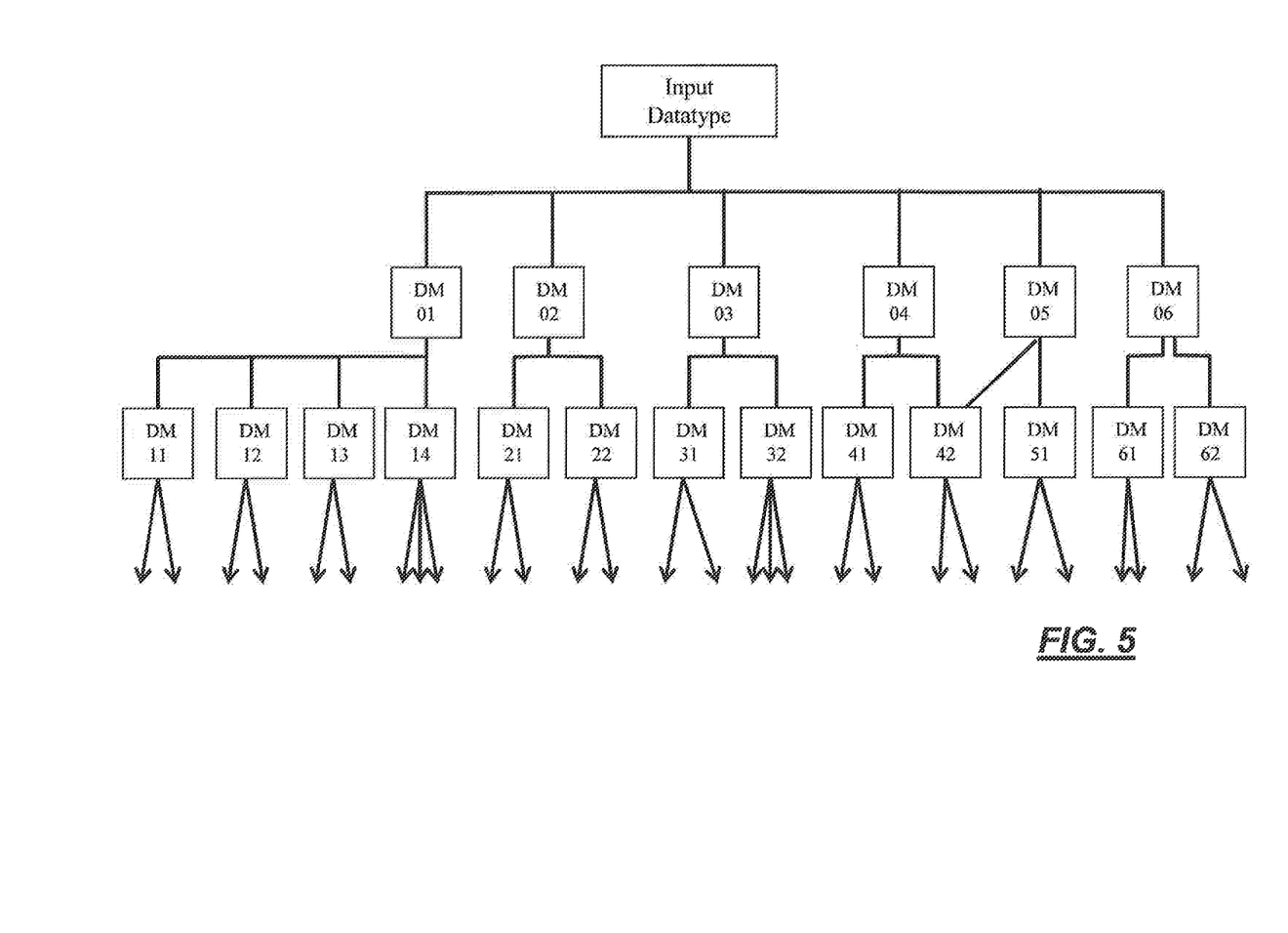
FIG. 5 is a diagram of the initial forward projection of data path modules in the creation of a data path scheme in a system according to the invention.

The first step 125 of the assembly of the data modules is the projection of the input datatypes by a number of iterations of linkage nodes, as illustrated in FIG. 5.

Referring to FIG. 3, the first step of data path generation is the forward projection, which involves the data path generation engine identifying all the data path modules that have input datatypes that are the same as the input datatypes of the query. This set of data path modules is illustrated by modules DM01 to DM06. Each of these modules has an input datatype the same as the given input datatype of the query.

The output datatypes of these six modules vary, and some modules have one datatype output, and others have two or more. For purposes of the data path generator, the output datatypes of the modules includes the datatypes of the data returned by the module, but also includes the set of input datatypes that the module is configured to receive. As a result, the output branches of the data modules DM01 to DM06 include all of the datatypes that have been determined to that point in each module's respective data path branch, or more specifically, all of the data-path input datatypes plus all of the datatypes of data returned by each of the modules DM01 to DM06.

In the event that there is duplication of a module in the first tier of forward-projected modules, i.e., if a module has two or more input datatypes and two or more of them match the data path input datatypes, then the data defining the projected data paths will identify a single occurrence of that data module with data defining linkages of that single module to the two data-path input datatypes.

Figure 6:
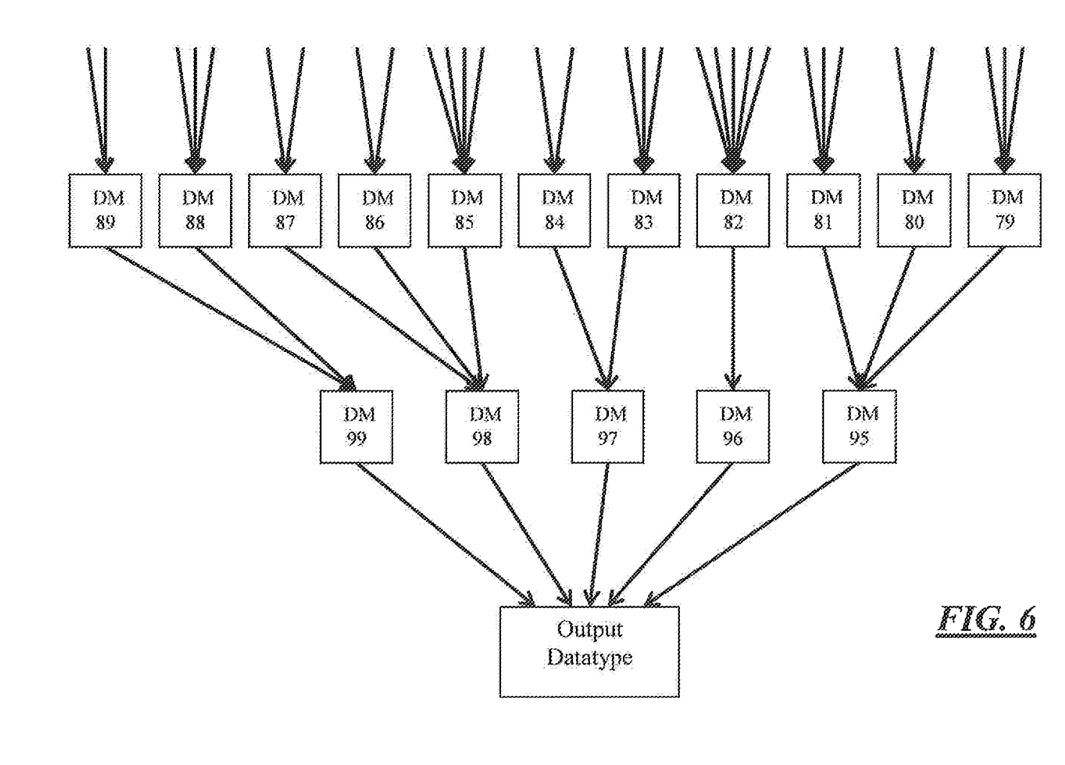
FIG. 6 is a diagram of the initial rearward projection of data path modules in the creation of a data path scheme in a system according to the invention.

After this first forward projection step 125 of modules, the system performs a step 129, also using the data module catalog data 125, that projects the data paths backward from each of the data-path output datatypes. As illustrated in the example of FIG. 6, the data path output datatype may match the output data types of several data modules in the data module catalog, e.g., DM 95 to DM 96.

The result of the first iteration of the data generation is the forward-projected set of modules DM 01 to DM 06, and the backward projected set of modules DM 95 to DM 99. The data path generation engine then in step 131 determines whether any connections have been made between the modules that create a path from any of the datapath output datatypes to any of the datapath input datatypes. If so, then that part of the data path is considered completed, and the open-ended backward branches of the datapath to that datapath output datatype are identified in step 132 and subsequent backward projections from them are not made.

At decision 134, it is then determined whether all output datatypes of the data path have been linked through data modules to the data path input datatypes. If so, the data path scheme has been completed. If not, the data path scheme is not complete.

At decision 136, it is determined whether the data path generation module has reached a point that it may be concluded that the datapath generation process has failed. That determination may be found for a variety of reasons, which preferably include:

1. A determination that a predetermined number of iterations of forward and/or backward projection have been completed without the data path scheme being completed;
2. A determination that the last iteration did not provide any new datatypes or new data of existing datatypes added to the set of open datatypes of the previous iteration; or
3. The projected duration of all of the forward-projected or backward-projected data paths calculated as the sum of the Module Time Estimates for the modules in the respective data path exceeds a predetermined time limit for processing the query. For example, processing of a specific target query for a pilot in an aircraft might be needed within three minutes, and it would be impossible to acquire the data needed to answer the query in that time interval.

In the event of a determination of a failure condition, a fail message 138 may be output.

If failure is not indicated, then the parameters of the data path projection may be adjusted if necessary. During the first few projections forward and backward this is normally not necessary, and all possible module linkages are created.

This repetition may be seen in FIG. 5, where the data path generation engine 109 determines, for all of the first-iteration modules DM01 to DM06, all of the modules that have input datatypes that match the output datatypes of any of those modules DM01 to DM06. This gives rise to another set of modules linked to each of the first set of linked modules DM01 to DM 06. In the example of the diagram of FIG. 5, modules DM11 to DM 14 can receive the outputs of the first module DM01, and modules DM21 and DM22 can receive the output of DM02, etc.

In the event that there is duplication of a module in the second tier of forward-projected modules, and one second-tier module has one input datatype matching the output datatype of one of the first tier modules, and another input datatype that matches the output datatype of another module in the first tier, then both of those first tier modules are linked to a single identification of the module. For example, in the diagram of FIG. 5, DM04 has an output datatype that matches an input datatype of DM42, and module DM05 has an output datatype that matches another input datatype of DM42. The data path scheme then links both DM04 and DM05 to the inputs of DM42.

The second tier of data path modules DM11 to DM62 themselves have outputs, and the output datatypes of the modules DM 11 to DM 62 are indicated to include both the datatype of the data returned by the module plus the datatypes of the inputs of those modules as well, so that the collection of the open output branches of those modules DM 11 to DM 62 includes all the datatypes that have been input or created to that layer of the iteration. In the next iteration of forward projection of the data modules the data path generator engine then repeats the forward projection of those output datatypes to all of the data path modules in the catalog. This gives rise to another third tier of data path modules, not shown in FIG. 5. That set of data path modules is more numerous, but can still be processed by the hosting computer system.

Similarly, on the next iteration of the rearward extension from data path modules DM 95 to DM 99, the system identifies the data path modules in the catalog that produce outputs with datatypes that match the inputs of the first tier of modules DM 95 to DM 99. This adds another layer or tier of modules labeled DM 79 to DM 89.

In subsequent iterations, the system will repeat the linkages backward another tier and will identify all of the data path modules in the catalog that have outputs associated with datatypes that match the datatypes associated with the inputs of the second tier of data path modules DM 79 to DM 89. This yields an additional tier of data path modules, not shown in the diagram, that have outputs that are linked in the data path generator to the second tier of data modules.

The forward and rearward linkages to all possible data path modules as illustrated in FIGS. 5 and 6 for each of the query input datatypes and query output datatypes is repeated for as many iterations or tiers as necessary, up to a predetermined number of iterations or until the number of modules identified reaches a limit. In combination, there may be millions of possible linkages calculated during the process, depending on the computational distance between the query input data types and query output datatypes. Generally, 8 or 9 jumps or steps of projecting the data modules forward or back is within the computational capability of the host computer system according to the invention. The actual number of iterations depends on the nature of the data path modules and how many different data modules have inputs or outputs with the same datatypes.

Referring to FIG. 3, as the forward and backward linkages are extended in each iteration, some of the identified data path modules of the forward linkage progression should match some of the identified modules of the rearward progression, and that indicates that at least one path between one of the data path inputs and one of the data path outputs has been accomplished. When there is a path from each of the data path outputs to one or more of the data path inputs, it is an indication that the data path scheme is complete. The linkages then are stored as data in the data path scheme data in a graph data storage format, and the other linkages can be deleted or ignored.

It should be noted that the data paths need not reach back to all of the data path inputs, because the purpose of the query is to obtain the output results at the data path outputs. If there is a path from each of the data path outputs to some but not all of the data path inputs, it simply means that the query contained more datatypes of constraint data than was necessary to respond to the query.

After a certain number of iterations, it may be desirable from the standpoint of computer efficiency to try to focus the subsequent iterations to reduce the computational effort needed to identify all of the possible data modules, per step 142.

One way that the projections may be more focused is by restricting the modules to those that are particularly fast, or by reducing the number of possible data paths that have been determined to those data paths that have an estimated total time requirement that is lower than a predetermined threshold time period, or by eliminating form further extrapolation or extension those partial data paths determined so far that have the longest estimated execution time. In each execution of a data path scheme created by the data path generation engine, the engine records and stores data regarding the processing time required to receive data from each data path module in the data path scheme. In creating future data path schemes, the data path generator engine takes this processing time information into account in determining how many iterations forward and backward to analyze potential data path schemes. For every module traversed in the data path, an expected processing time for that module is added to the expected total processing time; if the expected total processing time for a candidate data path exceeds some predetermined user-specific threshold, the data path generation engine terminates that data path and does not further search for modules that might be added to it. As a result, the data path generation engine will preferentially add modules to candidate data paths if they require less processing time than other modules with the same or similar input and output datatypes. Additionally, the data path generation engine can generate candidate data paths of varying lengths but comparable expected total processing times; as the engine proceeds, it adds modules preferentially to data paths with low expected total processing times.

The iteration parameters may also be adjusted to project only the more preferred data modules in the catalog based on the Module Utility Rating data. That also reduces the number of modules substantially, also reducing the computational effort required for another iteration.

Eventually the iterations will come to a point where the data paths from all of the data path output datatypes back to the data path input datatypes have been determined, or else the fail condition is met. If the data path scheme is the result, additional processing and creation of linkages may be required.

In addition to having paths back to the inputs from the data path outputs, for the data path scheme to be executable, every module in the data path scheme must have some sort of data supplied to all of its inputs to serve as arguments for the associated function call, or there will not be any output data produced due to lack the necessary arguments.

If the system reaches a point wherein the data path scheme is complete but one or more of the data path modules of the data path lacks a link to one of its module inputs, then the data path generator attempts to find appropriate input datatypes for those unlinked open data-module inputs. This is done by backward extending the data types from the unconnected data input. The process involves the backward projection or extension of the unlinked input's datatype to try to reach the data path input datatype shown as step 140.

If the data path cannot be extended back to the datapath input datatype, then the data path cannot be finalized. A fail message might be output, but preferably an interactive component of the data path generator engine issues a prompt to the user or transmits a message to the requesting system inviting the source of the query to provide the additional datatype and its constraint data. On entry of that information, the data path generator engine fills in the gap in the data path, and provides the completed data path scheme data to be optimized or simply executed.

Referring to FIG. 3, once a data path scheme has been prepared that meets the basic requirements, i.e., all data path outputs are linked to a path back to the data path inputs and all modules in the data path have all module inputs linked back by a path to the data path inputs, the system may still further process the data path scheme data so as to optimize the data path scheme. For example, the path might have some unnecessary duplication of computation that can be removed, or there might be specific modules that have been flagged by the system as inefficient. In addition, there may be several different viable data paths identified, and the most efficient based on time or other cost should be selected, subject to the preference of the user. The system in optimization step 133 corrects these issues, and also may provide for other optimization of the data path scheme. In addition to recording and storing data about the expected processing time associated with each module, the data path generation engine records and stores data regarding the utility of each module to producing the data path outputs requested in the user's query. The utility data can be calculated using multiple methods, depending on the level of direct user interaction maintained by the system, but preferentially the user is able to provide direct feedback on the quality of the query results via a scoring system, e.g. a numerical score, or via a response to a system message such as "Do these results meet your needs?" displayed through a presentation module soliciting that feedback. Positive or high-scoring feedback incrementally increases the expected utility of each module in the chain that produced it; negative or low-scoring feedback incrementally decreases the expected utility of each module in the chain that produced it. As a result, over time and repeated uses of the data path generation engine, the relative expected utility of each module to producing particular data path outputs can be calculated by the engine and preferentially included in the data path scheme.

Expressed somewhat differently, the process of data path generation is preferably according to the following steps:

1) Check each module in the module catalog to see if it takes a subset of the query input datatypes as its inputs; if it can, connect it to the respective data path input datatypes. Those modules each form a new candidate forward data path.
2) Check each module in the module catalog to see if it produces a subset of the query output datatypes as its outputs; if it can, connect it to the respective data path output datatypes. Those modules each form a new candidate backward data path.
3) If any of the query output datatypes does not have at least one module that produces that datatype as an output, terminate the entire procedure and inform the user of the nature of the error.
4) Otherwise, iterate the following:
   a. Check for solutions. For each candidate backward data path created in the last iteration or in steps 1 or 2, search the candidate forward data paths to identify whether any of them contain all of the datatypes required by the candidate backward data path. If so, save the combination of the candidate forward data path and the candidate backward data path as a candidate full data path.
   b. Update data path properties. For each candidate data path created in the last iteration or in steps 1 or 2, calculate the following:
      i. Set of datatypes available on that data path, by combining all of the data path modules' outputs (forward data path) or inputs (backward data path)
      ii. Expected total processing time on that data path, by adding the data path modules' expected processing times together.
      iii. Expected utility of that data path to the user, by multiplying the data path modules' utility scores together.
   c. Check stop conditions. For each candidate data path created in the last iteration or in steps 1 or 2, terminate that path if:
      i. No modules exist that can accept a candidate forward data path's output datatypes as inputs or produce a candidate backward data path's inputs as outputs.
      ii. The expected total processing time for the candidate data path exceeds the maximum user-specific processing time.
      iii. The total length of the candidate data path exceeds the maximum system-specific data path length.
      iv. All of the modules that accept the outputs of a candidate forward data path or that produce the inputs of a backward data path have already appeared in the respective data path, and the input datatypes of those modules have not been produced as the outputs of a subsequent module in the candidate data path (if forward) or the output datatypes of those modules have not been accepted as the inputs of a module of an antecedent in the candidate data path (if backward). In other words, there is no chance that data was updated since the last iteration.
   d. Extend the current best data path. For the candidate data path with the best combination of expected processing time and expected utility (the priority given to each being set by the user or user's system), search the module catalog for modules that can accept the candidate data path's output data types as input datatypes (forward) or can produce the candidate data path's input datatypes as output datatypes (backward). For each such module, create a new candidate data path by extending the existing candidate data path by appending the module with its associated input and output datatypes, expected processing time, and expected utility.

Utility is as defined in the Module Utility Rating data, and connecting data modules is accomplished by data defining links between the two modules, as discussed previously.

Once the data path scheme data has been finalized, the data defining it, i.e., the data path workflow graph, is converted by the data path generation engine into executable software composed of function calls to the data path modules.

Execution of the Data Path Workflow

The data path scheme is defined as data that identifies the set of data path modules to be executed as set out by data defining linkages between the data path inputs and the modules. The data of the data path scheme is preferably in graph form, and it references data modules listed in the data path module catalog 127.

The data path module catalog is, as described above, a structured database of modules and associated metadata that identifies the title or descriptive label of the data path module, as well as its input and output datatypes, stored location, and method of calling the associated function. The actual modules themselves are also stored so as to be accessible to the host computer system.

The data path generation engine processes the data path workflow and creates from it executable code that directs the host computer or connected computers to perform the series of linked module functions using the constraint data of the query as input to the executable data path module. The program within the data path generation engine that generates the executable code may be written in any programming language, and the resulting executable code may be formulated in any programming language, such as C++ or Python, and it may incorporate software copied from the actual stored modules, or it may access the modules as subroutine calls or function calls, or it may employ some other form of branching control, as is well known in the art.

Presentation of Results

The data path workflow, when executed by the host system with the query constraint data, results in outputs supplied via the return data linked to the data path outputs. That data may be presented to the user by a presentation module that may format and display the data in any way that is desired.

As an extension of the data path graph, specific presentation modules may be provided that have defined input datatypes and no output datatypes. For example, a presentation module might be configured to receive an address and print it in three formatted lines of text on a display viewable by the user. The datatype of the presentation module would match the datatype of the data path output to which it is linked, and the presentation module may be included in the data path workflow as the final step of the workflow for each of the data paths defined. The interactive program that processes the query may interact with the user at the time of entry of the query to invite a selection of the presentation module to be applied to the user's query.

The separate modules of the present invention may be implemented separately in a distributed system, or the system and method of the invention may be provided on a computer system in a single location. For example, the interaction module that receives the human-language query and translates it into a comprehensibly defined internally-formatted query may be a first computer system that outputs that translated query data to a second linked computer system. The second computer system in turn hosts the data path generation module or engine, and it receives the translated query and outputs data defining a data path scheme. A third computer may receive that data path scheme data and convert it to an executable program that it transmits to a fourth computer system that receives the executable module and runs it with the query constraint data do as to perform the procedures of the defined data path scheme for those input values, and to obtain the results of that workflow. Those results may be transmitted to another computer system that displays the results to a user or another entity using a presentation module.

In addition, the conceptual data path workflow has here been described as receiving the converted data of the query and its datatypes, and producing the output at a data path output or outputs. The data path may be expanded, however, to include the interactive module and the presentation modules as parts of the data path scheme that are ultimately incorporated in the executable software code once the data path workflow is determined by the system. In that case, the data path input is the user query, and the output is the display or transmission to the user, or to the requesting automatic system.

The terms herein should be read as terms of description not limitation, as those of skill in the art with this disclosure before them will be able to make changes and modifications therein without departing from the spirit of the invention.

What is claimed is:

1. A computer-executed method for obtaining information for a user, said method comprising:
    receiving a query input from the user;
    converting the query to data defining
        a set of one or more query input datatypes selected from a stored set of datatypes,
        a set of one or more query output datatypes selected from the stored set of datatypes, and
        a constraint data field for each of the query input datatypes;
    determining data path scheme data defining a data path scheme based on
        the data defining said one or more query input datatypes,
        the data defining said one or more query output datatypes, and
        stored data identifying a set of data path modules each having one or more module inputs and one or more module outputs, with each of the module inputs and module outputs being associated with a datatype in the stored set of datatypes;
    said data path scheme having one or more data path inputs and one or more data path outputs each associated with a respective one of the datatypes;
    said data path scheme data defining linkages of data path modules selected from the set of data path modules so that the data path scheme data defines for each of the data path outputs a respective data path that extends through the data path modules between said data path output and one or more of the data path inputs;
    wherein the data path scheme data defines said linkages between the data modules so that the linkages to each of the data module inputs are from a respective one of data path inputs or a respective one of the data module outputs, and linkages from the data module outputs are to a respective one of the data module inputs or to a respective one of the data path outputs; and
    wherein, for each of the linkages, the inputs, outputs or input and output linked thereby are associated with the same datatype.

2. The computer-executed method of claim 1, and further comprising
    formulating computer-executable instructions from the data path scheme data, and
    executing the instructions derived from the data path scheme data, including supplying the constraint data as the data path inputs.

3. The computer-executed method of claim 1, and further comprising
    deriving a result from the data path output or outputs; and
    presenting the result to the user on a display device using a presentation module, said presentation module being associated with one or more datatypes that are the same as one or more of the datatypes of the data path outputs.

4. The computer-executed method of claim 1, wherein the data path scheme data is stored as a workflow graph, and the data modules are each edges in said graph and the linkage datatypes are each nodes of the graph.

5. The computer-executed method of claim 1, wherein all of the steps of said method are performed on a single computer system at a location.

6. The computer-executed method of claim 1, wherein the step of determining said data path scheme data defining the data path scheme and the step of executing the instructions based on the data path scheme data are performed on separate computer systems.

7. The computer-executed method of claim 1, wherein a program receives the query input and screens the query for compliance with a set of syntax rules defined by stored data, and, where the query input does not satisfy the syntax rules, said program outputs a message to the user inviting modification of the query input with grammatical suggestions.

8. The computer-executed method of claim 1, wherein the converting of the query to data uses stored data defining rules of syntax.

9. The computer-executed method of claim 1, wherein the stored data of the data path modules is a module catalog database that comprises for each of said data path modules respective title data identifying the data path module, and respective function access data defining how said data path module is to be accessed, and said input and output datatypes thereof.

10. The computer-executed method of claim 9, wherein the determining of the data path scheme data includes
repeatedly extending linkages from the data path inputs to forward-linked data modules of the catalog database that have inputs that have the same datatype as the linked data path input, and extending linkages from the module outputs of said forward-linked data modules to additional forward-linked data modules in said catalog database that have module inputs associated with datatypes that are the same as the datatypes of the module outputs of the forward-linked data path modules.

11. The computer-executed method of claim 10, wherein the determining of the data path scheme data further includes repeatedly extending linkages backward from the data path outputs to backward-linked data modules of the catalog database that have module outputs that have the same datatype as the linked data path output, and extending linkages from the module inputs of said backward-linked data modules to additional backward-linked data modules in said catalog database that have module outputs associated with datatypes that are the same as the datatypes of the module inputs of the first backward-linked data path modules.

12. The computer-executed method of claim 10, wherein the set of module outputs of each of the modules include the datatypes of the module input or inputs of said module.

13. The computer-executed method of claim 11, wherein more forward-linked groups of the data modules and more backward-linked groups of the data modules are linked to the already linked forward and backward-linked modules with linkages between inputs or outputs that are associated with the same datatypes until there is a data path from each of the data path outputs to a data path input.

14. The computer-executed method of claim 11, wherein the determining of the data path scheme data includes projecting modules selected based on data defining estimated time required for execution thereof, wherein the estimated time is determined by data received regarding time required for earlier executions thereof.

15. The computer-executed method of claim 1, wherein, if any of the data path modules has a module input that does not have a linkage thereto in the data path scheme data, then the method further comprises
transmitting a message to the user that data conforming to the datatype of said module input is needed to process the query.

16. The computer-executed method of claim 1, wherein the data path scheme data further identifies one or more presentation modules each associated with a respective datatype from said stored datatypes, and wherein the datatypes of the presentation module and the data paths output are the same.

17. A system for providing access to data to a user, said system comprising:
a computer having computer accessible data storage associated therewith;
said computer being configured to receive query data comprising
a set of one or more query input datatypes selected from a stored set of datatypes,
a set of one or more query output datatypes selected from the stored set of datatypes, and
a constraint data field for each of the query input datatypes;
said computer having stored thereon or accessible thereto
stored data-type data that constitutes a collection of datatypes of data; and
stored data-module data that constitutes a catalog of data modules each having a field identifying the data module, and fields identifying datatypes of one or more module inputs and one or more module outputs;
a set of one or more query input datatypes selected from a stored set of datatypes,
a set of one or more query output datatypes selected from the stored set of datatypes, and
a constraint data field for each of the query input datatypes;
a data-path generating program that generates data path scheme data that defines a data path scheme formed of linked data modules selected from the catalog of data modules,
said data path scheme having one or more data path inputs each corresponding to a respective one of the query input datatypes and one or more data path outputs each corresponding to a respective one of the query output datatypes, and
wherein each module input of each data module of the data path scheme is connected with and receives data from either one of the data path inputs or one of the module outputs of one of the other data modules of the data path, and
wherein the data path outputs are each connected with and receive data from the module output of one of the data modules or one of the data path inputs.

18. The system of claim 17, wherein the computer also has stored thereon or access to data that constitutes executable code for one or more of the data path modules, and said computer uses said executable code to formulate data corresponding to executable instructions for said computer of another computer to perform a series of operation defined by the data path scheme data.

19. The system of claim 17, and a computer station having an input device associated therewith and accessible to a user, said computer station having an interactive program running thereon that causes the computer station to receive a query through the input device from the user and to convert the query into to the query data, said computer station then transmitting the query data to the computer.

20. The system of claim 17, and said computer or another computer system having a data path execution software that performs a series of data operations defined by the data modules and linkages therebetween as defined the data path scheme data, wherein the constraint data is supplied as an input or inputs to the data path execution software so that a workflow based thereon proceeds according to the data path scheme and the data path execution software yields output result data.

21. The system of claim 17, wherein said computer has a display device visible to a user and presentation software running on the computer that receives the output result data and transmits or displays the output result data to the user, wherein the presentation software is a presentation module selected from a set of presentation modules stored on the computer, said presentation module having an input having associated therewith a datatype that the presentation module is configured to receive and display to a user on said display device, the datatype of the presentation module being the same as one of the query output datatypes.

* * * * *